(12) United States Patent
White

(10) Patent No.: US 12,312,030 B2
(45) Date of Patent: May 27, 2025

(54) HAULING AND SPREADING TRAILER ASSEMBLY

(71) Applicant: Shelley White, Holland Landing (CA)

(72) Inventor: Shelley White, Holland Landing (CA)

( * ) Notice: Subject to any disclaimer, the term of this patent is extended or adjusted under 35 U.S.C. 154(b) by 835 days.

(21) Appl. No.: 17/549,243

(22) Filed: Dec. 13, 2021

(65) Prior Publication Data

US 2023/0182836 A1    Jun. 15, 2023

(51) Int. Cl.
*B62D 63/00* (2006.01)
*B60P 1/56* (2006.01)
*B62D 63/06* (2006.01)

(52) U.S. Cl.
CPC .............. *B62D 63/062* (2013.01); *B60P 1/56* (2013.01)

(58) Field of Classification Search
CPC ................................. B62D 63/062; B60P 1/56
USPC ............................................................ 298/24
See application file for complete search history.

(56) References Cited

U.S. PATENT DOCUMENTS

| | | | |
|---|---|---|---|
| 3,220,740 A | 11/1965 | Kavan | |
| 3,865,046 A * | 2/1975 | Fuller | B61D 7/20 105/282.2 |
| 3,938,861 A * | 2/1976 | Bagwell | B61D 7/20 105/247 |
| 3,997,215 A | 12/1976 | Parker | |
| 4,009,907 A * | 3/1977 | Stanfill | B61D 7/22 105/282.2 |
| 4,365,841 A * | 12/1982 | McLaughlin | B60P 1/56 280/442 |
| 5,038,966 A * | 8/1991 | Olk | B61D 7/20 222/561 |
| 6,847,405 B2 | 1/2005 | Hsu et al. | |
| 7,445,419 B2 | 11/2008 | Andersen | |
| D761,160 S | 7/2016 | Gilles Duros | |
| 2003/0175103 A1* | 9/2003 | Hunt | A01D 41/1208 414/526 |
| 2011/0198824 A1 | 8/2011 | Markovich | |
| 2016/0116213 A1 | 4/2016 | Dykes | |

* cited by examiner

*Primary Examiner* — Steven O Douglas

(57) ABSTRACT

A hauling and spreading trailer assembly for spreading loose material includes a trailer, which has a tongue that is engageable to a hitch of a tow vehicle. The trailer comprises a fixed bottom in which a plurality of apertures is positioned. A plurality of sidewalls extends substantially perpendicularly from the fixed bottom. A false bottom is slidably engaged to the trailer so that the false bottom is selectively positionable in first and second positions in which at least one of the apertures is at least partially open and the apertures are closed, respectively. A load of flowable material is positionable in the trailer with the false bottom in the second position. The false bottom can be selectively slid to the first position to dispense the flowable material through the at least one aperture, thereby allowing the flowable material to be spread at the trailer is towed.

8 Claims, 7 Drawing Sheets

HAULING AND SPREADING TRAILER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trailer assemblies and more particularly pertains to a new trailer assembly for spreading loose material. The present invention discloses a trailer assembly comprising a trailer having a fixed bottom and a false bottom. The false bottom is selectively slidable relative to the fixed bottom to at least partially open at least one aperture of a plurality apertures positioned in the fixed bottom, allowing flowable material in the trailer to be spread as the trailer is towed.

(2) Description of Related Art Including Information Disclosed Under 37 CFR 1.97 and 1.98

The prior art relates to trailer assemblies. Prior art trailer assemblies for dispensing flowable materials may comprise rear dispensing trailers, bottom dumping trailers, and trailers with perforated drying racks. What is lacking in the prior art is a trailer assembly comprising a trailer having a fixed bottom and a false bottom. The false bottom is selectively slidable relative to the fixed bottom to at least partially open at least one aperture of a plurality apertures positioned in the fixed bottom, allowing flowable material in the trailer to be spread as the trailer is towed.

BRIEF SUMMARY OF THE INVENTION

An embodiment of the disclosure meets the needs presented above by generally comprising a trailer, which has a tongue that is configured to engage a hitch of a tow vehicle so that the trailer is towable by the tow vehicle. The trailer comprises a fixed bottom in which a plurality of apertures is positioned. A plurality of sidewalls extends substantially perpendicularly from the fixed bottom to define an open top of the trailer. A false bottom is slidably engaged to the trailer so that the false bottom is selectively positionable in a first position and a second position. In the first position, at least one of the apertures is at least partially open. In the second position, the apertures are closed. The trailer is configured for positioning of a load of flowable material, which is retained in the trailer with the false bottom in the second position. The false bottom is configured to be selectively slid to the first position to dispense the flowable material through the at least one aperture, thereby allowing the flowable material to be spread at the trailer is towed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
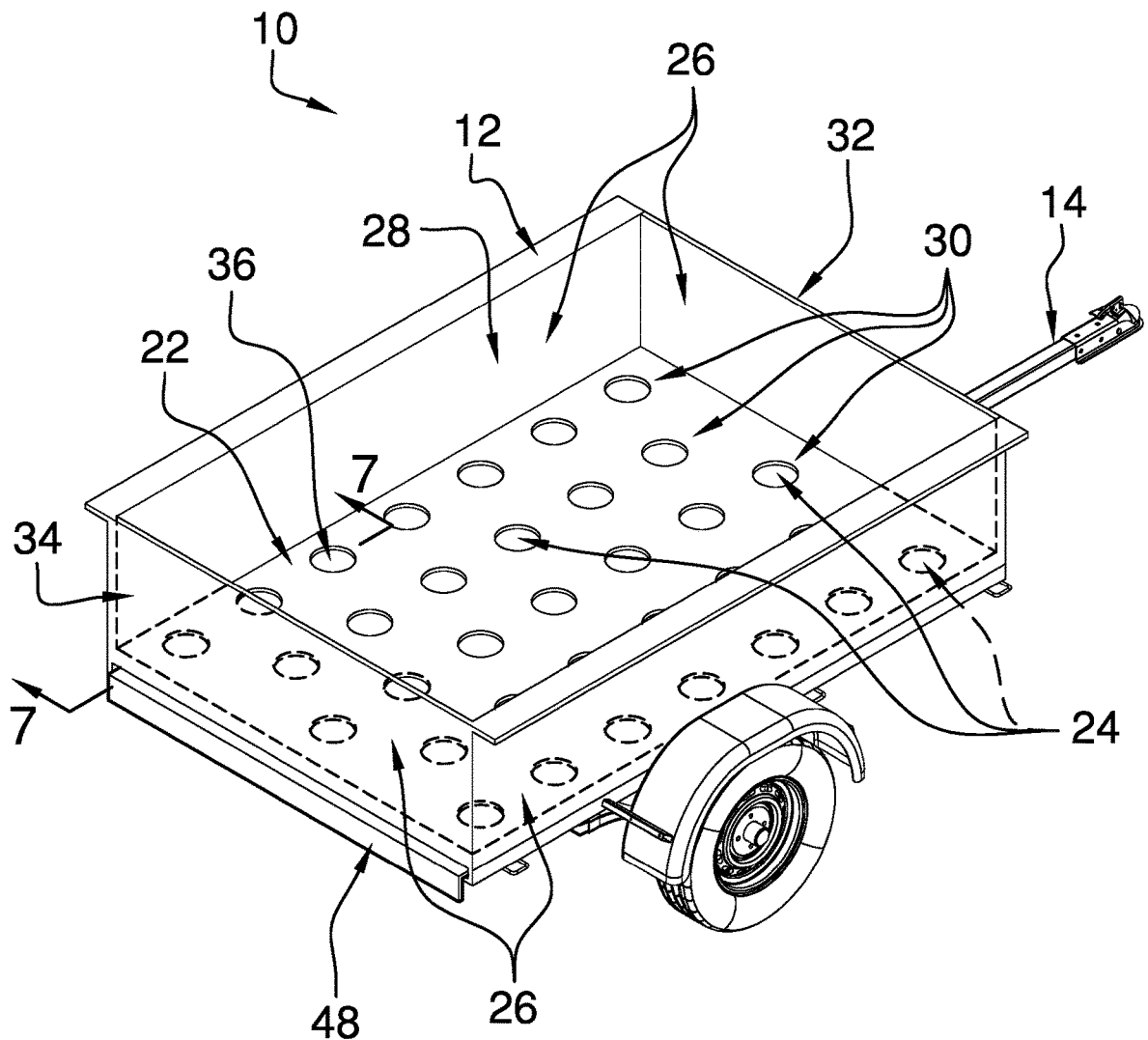
FIG. 1 is an isometric perspective view of a hauling and spreading trailer assembly according to an embodiment of the disclosure.

With reference now to the drawings, and in particular to FIGS. 1 through 7 thereof, a new trailer assembly embodying the principles and concepts of an embodiment of the disclosure and generally designated by the reference numeral 10 will be described.

Figure 6:
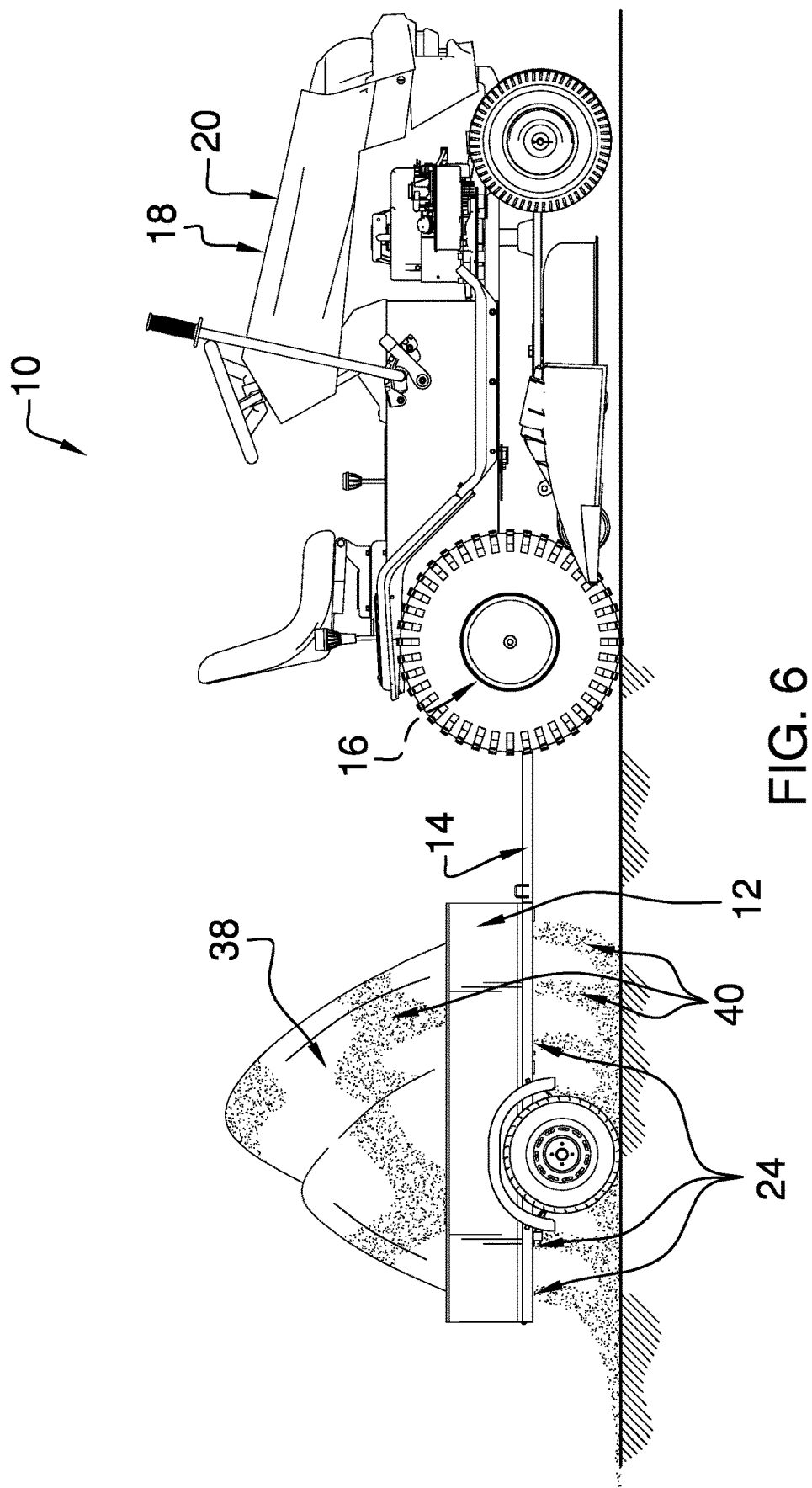
FIG. 6 is an in-use view of an embodiment of the disclosure.

As best illustrated in FIGS. 1 through 7, the hauling and spreading trailer assembly 10 generally comprises a trailer 12, which has a tongue 14 that is configured to engage a hitch 16 of a tow vehicle 18. The trailer 12 is towable by the tow vehicle 18, such as a lawn tractor 20 as shown in FIG. 6. The trailer 12 may be two-wheeled, as shown in FIG. 1, although the present invention also anticipates the trailer 12 be four-wheeled or six-wheeled.

The trailer 12 comprises a fixed bottom 22 in which a plurality of apertures 24 is positioned. A plurality of sidewalls 26 extends substantially perpendicularly from the fixed bottom 22 to define an open top 28 of the trailer 12.

The apertures 24 may be circular and the plurality of apertures 24 may be positioned in a set of rows 30, which extends from proximate to a front 32 to proximate to a rear 34 of the trailer 12. The present invention also anticipates alternatively shaped apertures 24, such as, but not limited to, square, oval, elongated slots, and the like.

Figure 2:
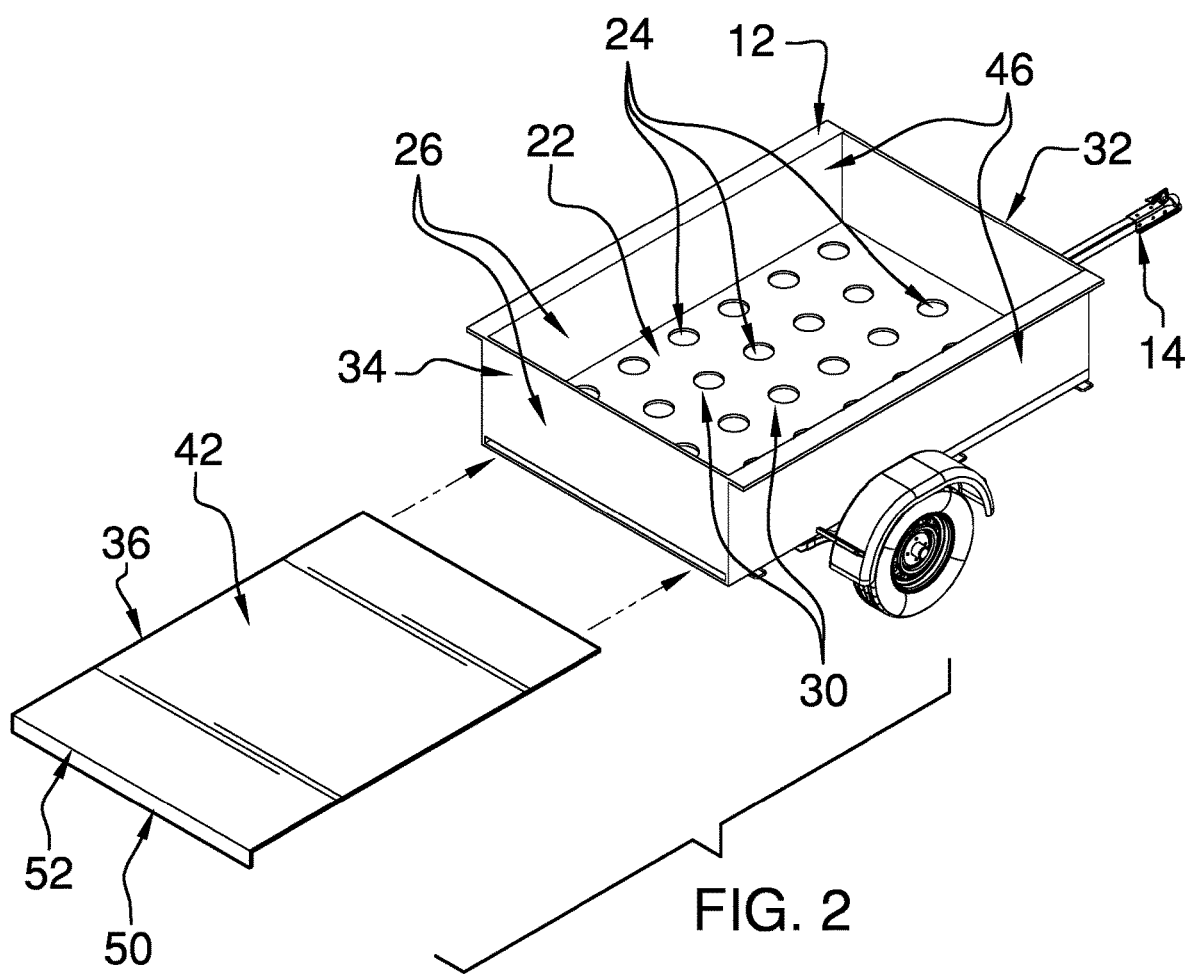
FIG. 2 is an isometric perspective view of an embodiment of the disclosure.
Figure 3:
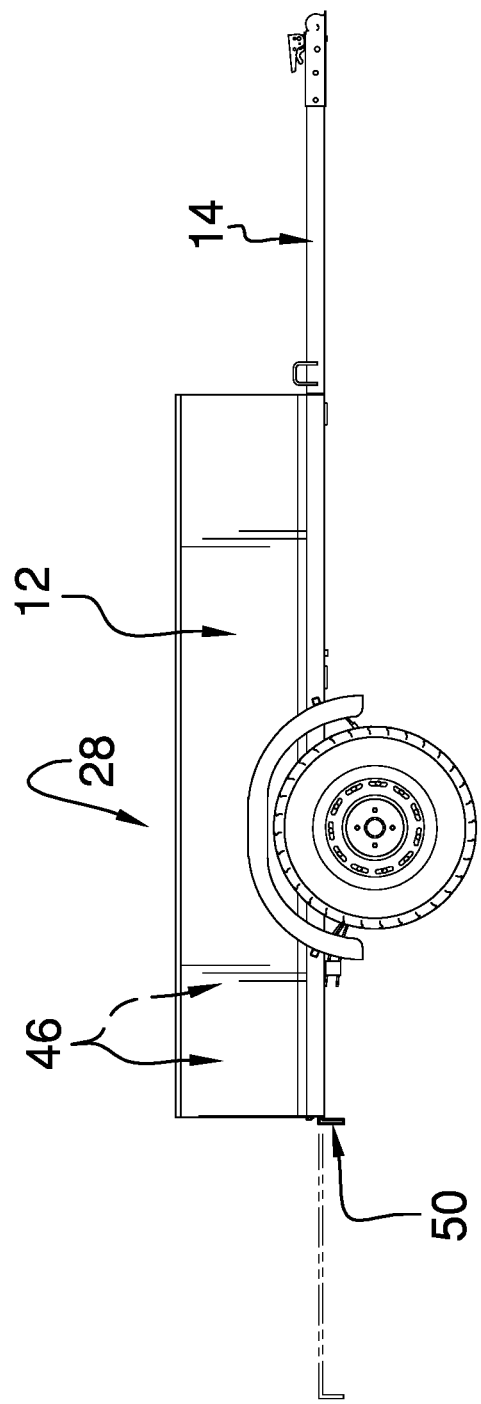
FIG. 3 is a side view of an embodiment of the disclosure.

A false bottom 36 is slidably engaged to the trailer 12 so that the false bottom 36 is selectively positionable in a first position and a second position. In the first position, as shown in FIG. 2, at least one of the apertures 24 is at least partially open. In the second position, as shown in FIG. 1, the apertures 24 are closed. The trailer 12 is configured for positioning of a load 38 of flowable material 40, which is retained in the trailer 12 with the false bottom 36 in the second position. The false bottom 36 is configured to be selectively slid to the first position to dispense the flowable material 40 through the at least one aperture 24, thereby allowing the flowable material 40 to be spread as the trailer 12 is towed. The present invention is anticipated to be useful in spreading a variety of flowable materials 40, such as, but not limited to, soil, sand, fertilizer, gravel, rocks, and the like.

The false bottom 36 may comprise a solid panel 42. The solid panel 42 can be completely removed, as shown in FIG. 2, so that all of the apertures 24 are open. Alternatively, the solid panel 42 may only be partially removed so that some of the apertures 24 remain closed. The present invention also anticipates a plurality of openings (not shown) positioned in the false bottom 36. The openings would be complementary to the apertures 24 and would be positioned such that they can be selectively aligned with the apertures 24 to allow the flowable material 40 to pass through the false bottom 36.

Figure 4:
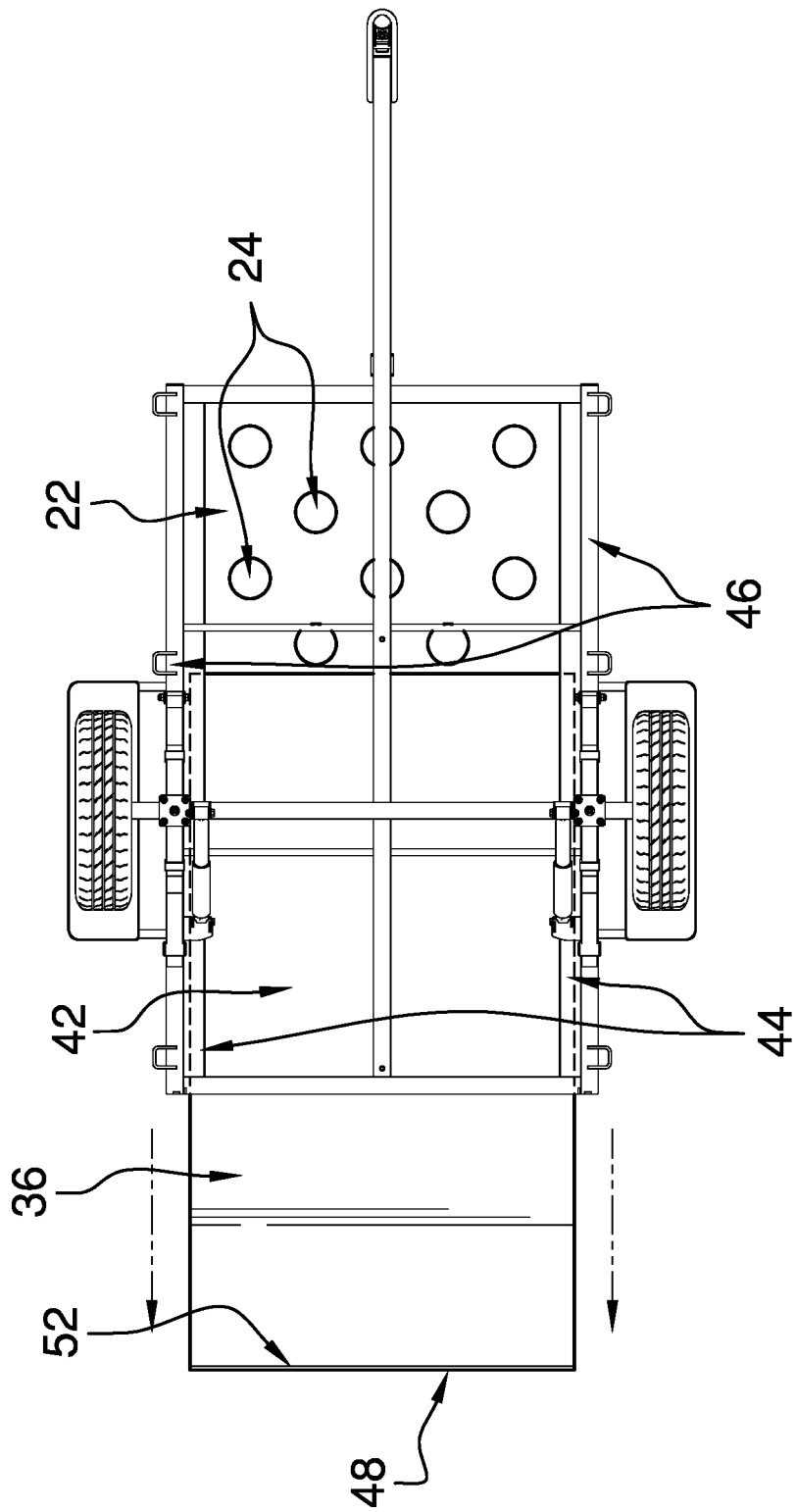
FIG. 4 is a bottom view of an embodiment of the disclosure.
Figure 5:
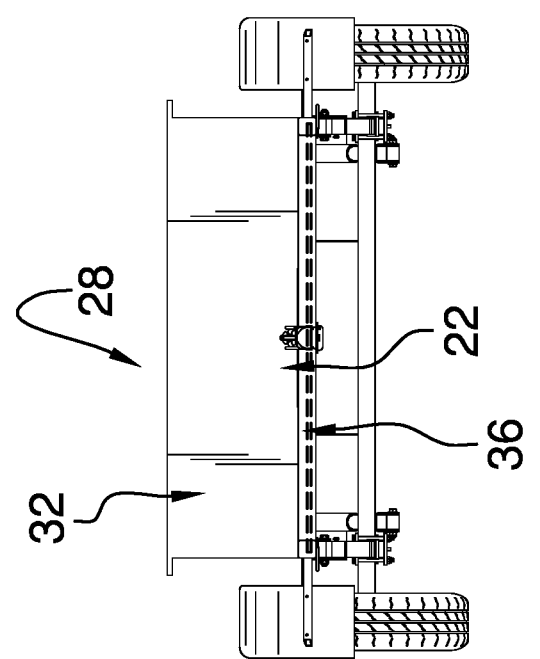
FIG. 5 is a front view of an embodiment of the disclosure.
Figure 7:
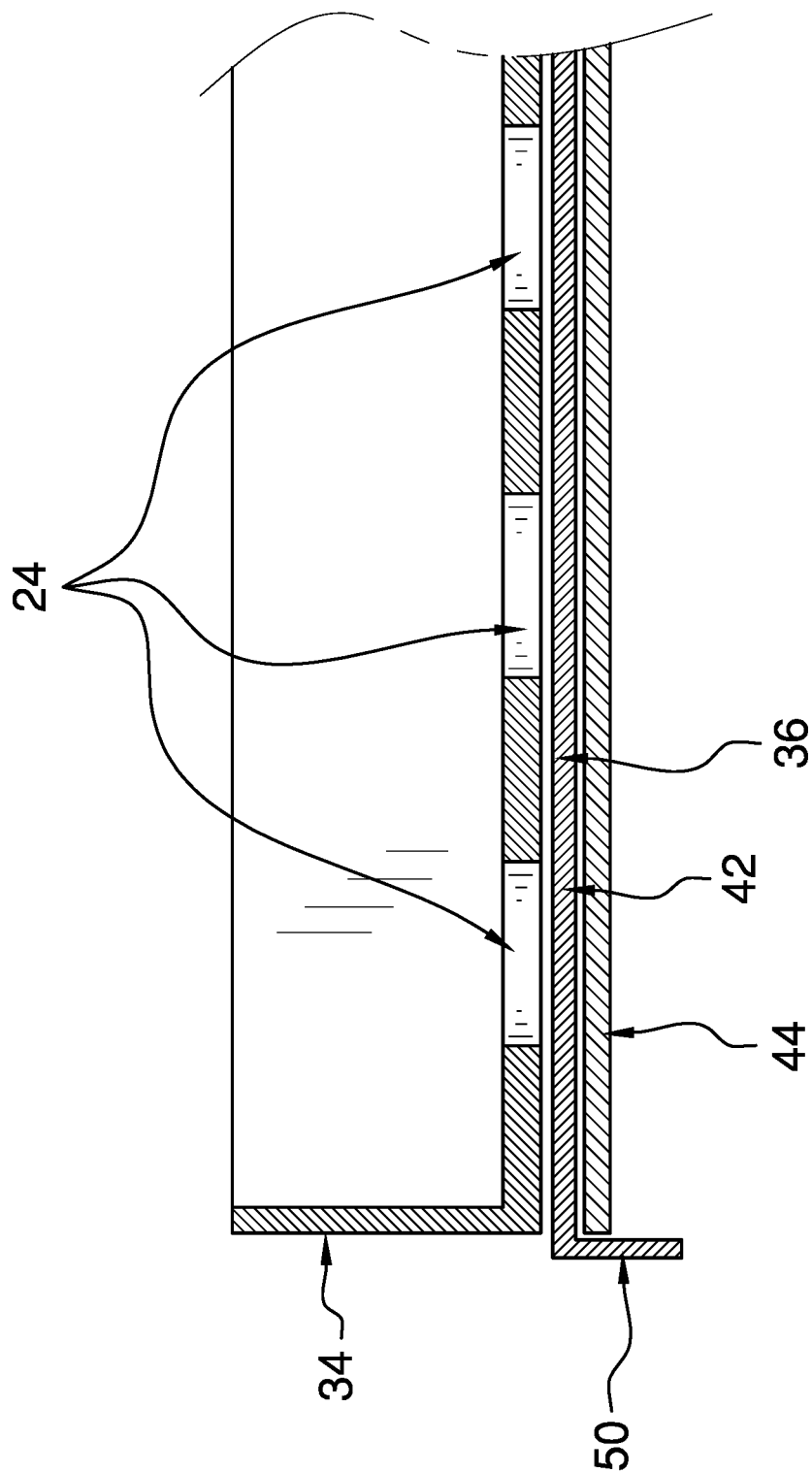
FIG. 7 is a cross-sectional view of an embodiment of the disclosure.

Each of a pair of rails 44 is engaged to the fixed bottom 22 and extends along a respective opposed side 46 of the trailer 12. The false bottom 36 is slidably engaged to the pair of rails 44 so that the false bottom 36 is selectively slidable from the rear 34 of the trailer 12, as shown in FIG. 4. A handle 48 is engaged to the false bottom 36 and is configured to be grasped in a hand of a user, positioning the user to slide the false bottom 36 on the rails 44. The handle 48 may comprise a lip 50, which is engaged to and which extends transversely from a back edge 52 of the false bottom 36, as shown in FIG. 7. The handle 48 also may comprise other grasping means, such as recesses, grasps, and the like.

In use, the tongue 14 of the trailer 12 is engaged to the hitch 16 of the tow vehicle 18. With the false bottom 36 in the second position, a load 38 of flowable material 40 can be positioned in the trailer 12 and transported to a location where the flowable material 40 is to be spread. The false bottom 36 then is slid to the first position and the trailer 12 is towed to dispense the flowable material 40 through the apertures 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hauling and spreading trailer assembly comprising:
a trailer having a tongue configured for engaging a hitch of a tow vehicle, such that the trailer is towable by the tow vehicle, the trailer comprising:
a fixed bottom,
a plurality of apertures positioned in the fixed bottom, and
a plurality of sidewalls extending substantially perpendicularly from the fixed bottom defining an open top of the trailer;
a false bottom slidably engaged to the trailer, such that the false bottom is selectively positionable in a first position, wherein at least one of the apertures is at least partially open, and a second position, wherein the apertures are closed, wherein the trailer is configured for positioning of a load of flowable material, such that the flowable material is retained in the trailer with the false bottom in the second position, wherein the false bottom is configured for selectively sliding to the first position for dispensing the flowable material through the at least one aperture; and
a pair of rails, each rail being engaged to the fixed bottom and extending along a respective opposed side of the trailer, the false bottom being slidably engaged to the pair of rails, such that the false bottom is selectively slidable from the rear of the trailer.

2. The hauling and spreading trailer assembly of claim 1, wherein the trailer is two-wheeled.

3. The hauling and spreading trailer assembly of claim 1, wherein the apertures are circular.

4. The hauling and spreading trailer assembly of claim 1, wherein the plurality of apertures is positioned in a set of rows extending from proximate to a front to proximate to a rear of the trailer.

5. The hauling and spreading trailer assembly of claim 1, wherein the false bottom comprises a solid panel.

6. The hauling and spreading trailer assembly of claim 1, further including a handle engaged to the false bottom, wherein the handle is configured for grasping in a hand of a user, positioning the user for sliding the false bottom on the rails.

7. The hauling and spreading trailer assembly of claim 6, wherein the handle comprises a lip engaged to and extending transversely from a back edge of the false bottom.

8. A hauling and spreading trailer assembly comprising:
a trailer having a tongue configured for engaging a hitch of a tow vehicle, such that the trailer is towable by the tow vehicle, the trailer being two-wheeled, the trailer comprising:
a fixed bottom,
a plurality of apertures positioned in the fixed bottom, the apertures being circular, the plurality of apertures being positioned in a set of rows extending from proximate to a front to proximate to a rear of the trailer, and
a plurality of sidewalls extending substantially perpendicularly from the fixed bottom defining an open top of the trailer;

a false bottom slidably engaged to the trailer, such that the false bottom is selectively positionable in a first position, wherein at least one of the apertures is at least partially open, and a second position, wherein the apertures are closed, wherein the trailer is configured for positioning of a load of flowable material, such that the flowable material is retained in the trailer with the false bottom in the second position, wherein the false bottom is configured for selectively sliding to the first position for dispensing the flowable material through the at least one aperture, the false bottom comprising a solid panel;

a pair of rails, each rail being engaged to the fixed bottom and extending along a respective opposed side of the trailer, the false bottom being slidably engaged to the pair of rails, such that the false bottom is selectively slidable from the rear of the trailer; and a handle engaged to the false bottom, wherein the handle is configured for grasping in a hand of a user, positioning the user for sliding the false bottom on the rails, the handle comprising a lip engaged to and extending transversely from a back edge of the false bottom.

* * * * *